2,956,983

PROCESS FOR THE PRODUCTION OF COLORLESS POLYOLEFINES BY THE LOW PRESSURE PROCESS

Ermbrecht Rindtorff, Recklinghausen, Karl Schmitt, Herne, and Günther Keller, Wanne-Eickel, Germany, assignors to Bergwerksgesellschaft Hibernia Aktiengesellschaft, Herne, Germany, a corporation of Germany No Drawing. Filed Feb. 28, 1956, Ser. No. 568,410

Claims priority, application Germany Nov. 2, 1955

10 Claims. (Cl. 260—45.95)

Polyolefines produced by the Zeigler process must be freed after the polymerization from the catalyst residues which they contain. The disturbing catalyst residues are principally compounds of low valent titanium or other metals of the 4th group of the periodic system. These impurities are removed substantially by washing the polymer with anhydrous alcohol of low boiling point. However, it is often the case that in spite of very intensive washings, which require considerable quantities of washing agents, polyolefines discolor on working up. These discolorations are probably due to traces of titanium compounds which can hardly be removed and in any case the discolorations reduce the quality and usefulness of the polymer.

It has now been found that the polyolefines can in every case be obtained completely colorless if the procedure is such that after drying the product small quantities of alcohols remain in the product which convert the traces of colored titanium compounds into colorless complex or ester compounds. Since low boiling alcohols evaporate without residue both during the drying and also during the working up at elevated temperatures, small quantities of high boiling mono- or polyhydric alcohols, such for example as cyclohexanol, ethylene glycol, glycerin, sorbitol and the like, must be added to the washing alcohols, the first mentioned alcohols remaining in the polyolefines both during the drying and also during the working up at elevated temperatures. The quantities of higher alcohols required for this purpose are extremely small. Quantities from 0.01% to 0.5%, calculated on the dried polymer, give the desired effect. The high boiling mono- or polyhydric alcohols can be added at any desired stage of the working up process, i.e. during the alcohol washing or during the water washing, the desired effect being obtained in each case. In the case where the high boiling alcohol is added during the water washing, the filtrate can be re-used for subsequent batches.

Examples (1) 50 kg. of polyethylene, which had been polymerized in 200 litres of cyclohexane, are added to 600 litres of methanol, stirred well, centrifuged off and thereafter washed with 400 litres of water in which 100 gm. of sorbitol have been dissolved. After centrifuging and drying a polymer is obtained with an ash content below 0.05% and a chlorine content below 0.005%, which remains completely white during working up at high temperatures.

(2) 50 kg. of polypropylene, which had been polymerized in 150 litres of hydrocumene, are added to 600 litres of isopropanol, stirred well, centrifuged off and then washed again with 200 litres of isopropanol to which 100 to 200 gm. of cyclohexanol has been added. After intensive stirring polypropylene is centrifuged off and dried. A polymer is obtained with an ash content of less than 0.05% and a chlorine content of less than 0.005%, which remains completely white on working up.

(3) 50 kg. of polyethylene are polymerised in 200 litres of cyclohexane added to 400 litres of methanol, washed and centrifuged and then washed again with 200 litres of methanol. After centrifuging off the polyethylene is suspended in 200 litres of water to which 150 gm. of glycol, sorbitol or cyclohexanol have been added. After stirring for 10 minutes the polyethylene is centrifuged off and dried. A polymer is obtained which remains completely white during working up at high temperatures.

(4) The polyethylene which has been washed twice with methanol according to Example 3, is washed with the filtrate from the washing water of Example 3, to which a further 50 litres of water with 25 gm. of sorbitol have been added to make up the loss.

What we claim is:

1. Improvements in the production of colorless polymeric olefins of the class consisting of polyethylene and polypropylene, wherein a titanium halide catalyst is used to effect polymerization of the olefin, which comprises washing the freshly prepared polymer with a washing liquid which includes a high boiling alcoholic compound which combines with residual traces of the titanium catalyst, said high boiling alcoholic compound being selected from the class consisting of glycol, glycerol, sorbitol and cyclohexanol, and being present in an amount of at least 0.01% calculated on the dry polymer.

2. Process in accordance with claim 1, wherein the freshly prepared polymer is washed with a lower molecular weight monohydric alkanol, and then washed with water containing the high boiling alcoholic compound.

3. Process in accordance with claim 2, wherein the polymer is polyethylene.

4. Process in accordance with claim 2, wherein the polymer is polypropylene.

5. Process in accordance with claim 1, wherein the high boiling alcohol is glycol.

6. Process in accordance with claim 1, wherein the high boiling alcohol is glycerol.

7. Process in accordance with claim 1, wherein the high boiling alcohol is sorbitol.

8. Process in accordance with claim 1, wherein the high boiling alcohol is cyclohexanol.

9. Process in accordance with claim 1, wherein the polymer is polyethylene.

10. Process in accordance with claim 1, wherein the polymer is polypropylene.

References Cited in the file of this patent

UNITED STATES PATENTS

| | | |
|---|---|---|
| 2,699,457 | Ziegler | Jan. 11, 1955 |
| 2,711,401 | Lally | June 21, 1955 |
| 2,827,445 | Bartolomeo | Mar. 18, 1958 |
| 2,834,768 | Friedlander | May 13, 1958 |
| 2,845,412 | Heyson | July 19, 1958 |
| 2,919,264 | Frese | Dec. 29, 1959 |
| 2,928,815 | Hammer et al. | Mar. 15, 1960 |

FOREIGN PATENTS

| | | |
|---|---|---|
| 614,594 | Great Britain | Dec. 17, 1948 |